(12) United States Patent
Shipley et al.

(10) Patent No.: US 12,319,204 B2
(45) Date of Patent: Jun. 3, 2025

(54) PERSONAL DEVICE HOLDER

(71) Applicant: Ford Global Technologies, LLC, Dearborn, MI (US)

(72) Inventors: Robert Charles Shipley, Westland, MI (US); Steven Vega, Royal Oak, MI (US); Chris Fredriksson, LaSalle (CA); Patrick Oliver Vanderpool, Southfield, MI (US); Cheryl Harris-Samborski, Saline, MI (US); Gary Vincent Morales, Northville, MI (US); Rafael Rego, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

(21) Appl. No.: 18/206,123

(22) Filed: Jun. 6, 2023

(65) Prior Publication Data
US 2024/0409039 A1    Dec. 12, 2024

(51) Int. Cl.
| | |
|---|---|
| *B60R 11/02* | (2006.01) |
| *B60N 2/80* | (2018.01) |
| *B60N 2/879* | (2018.01) |
| *B60R 11/00* | (2006.01) |

(52) U.S. Cl.
CPC ............ *B60R 11/02* (2013.01); *B60N 2/879* (2018.02); *B60N 2002/899* (2018.02); *B60R 2011/0017* (2013.01); *B60R 2011/0071* (2013.01)

(58) Field of Classification Search
CPC ............ B60R 11/02; B60R 2011/0017; B60R 2011/0071; B60N 2/879
See application file for complete search history.

(56) References Cited

U.S. PATENT DOCUMENTS

| | | | |
|---|---|---|---|
| 8,833,716 B2* | 9/2014 | Funk | F16M 13/022 |
| | | | 248/316.4 |
| 9,233,649 B2* | 1/2016 | Bisceglia | B60K 35/10 |
| 9,581,291 B2* | 2/2017 | Trotsky | F16M 13/04 |
| 9,749,002 B1* | 8/2017 | Fan | H04M 1/04 |
| 10,220,796 B2 | 3/2019 | Neumann et al. | |
| 10,292,282 B1 | 5/2019 | Platt | |
| 10,374,375 B2 | 8/2019 | Donia et al. | |
| 11,383,654 B2* | 7/2022 | Gougeon | B60R 11/0241 |
| 2010/0079285 A1* | 4/2010 | Fawcett | E05B 73/0082 |
| | | | 70/57.1 |
| 2012/0120626 A1* | 5/2012 | Akaike | B60R 11/02 |
| | | | 361/807 |
| 2018/0065567 A1* | 3/2018 | Osterhoff | B60N 2/64 |

(Continued)

*Primary Examiner* — Derek J Battisti
(74) *Attorney, Agent, or Firm* — Vichit Chea; Price Heneveld LLP

(57) ABSTRACT

A device holder assembly that includes a body with a housing coupled to the body. A leg assembly is coupled to the housing. The leg assembly includes a first leg and a second leg that are movable between a recessed position and an extended position. A first finger is rotatably coupled to the first leg. A second finger is rotatably coupled to the second leg. The first leg and the second leg and both movable between a deployed position and a retracted position. A third finger is disposed between the first finger and the second finger. The third finger is rotatably coupled to a center portion of the housing. The third finger is rotatable between a deployed position and a retracted position.

13 Claims, 9 Drawing Sheets

(56) References Cited

U.S. PATENT DOCUMENTS

| | | | |
|---|---|---|---|
| 2018/0118343 A1* | 5/2018 | Castaing | B64D 11/00152 |
| 2018/0222400 A1* | 8/2018 | Neumann | B60R 7/043 |
| 2022/0094183 A1* | 3/2022 | Huffman | H02J 7/0044 |

* cited by examiner

PERSONAL DEVICE HOLDER

FIELD OF THE DISCLOSURE

The present disclosure generally relates to a device holder assembly, in particular, a device holder assembly that can retain a range of devices in a range of positions.

BACKGROUND OF THE DISCLOSURE

Electronic devices are commonly brought into motor vehicles. The electronic devices brought into motor vehicles typically range in size and shape. Some electronic devices are held by passengers in a vehicle while other electronic devices are stored in the vehicle. However, the variation in size of the electronic devices may prevent storage of select electronic devices of greater size or of lesser size.

SUMMARY OF THE DISCLOSURE

According to a first aspect of the present disclosure, the present invention relates to a device holder assembly of a vehicle that includes a body with a body outer surface. A housing is coupled to the body. A leg assembly is coupled to the housing. The leg assembly includes a first leg and a second leg that are movable between a recessed position and an extended position. A first finger is rotatably coupled to the first leg. The first finger is movable between a first finger deployed position and a first finger retracted position. A second finger is rotatably coupled to the second leg. The second finger is movable between a second finger deployed position and a second finger retracted position. A third finger is disposed between the first finger and the second finger. The third finger is rotatably coupled to a center portion of the housing. The third finger is movable between a third finger deployed position and a third finger retracted position.

Embodiments of the first aspect of the present disclosure can include any one or a combination of the following features:
- the first finger includes a first finger inner surface and the third finger includes a third finger inner surface, and the first finger inner surface is substantially parallel to the third finger inner surface when the first finger is in the first finger deployed position and the third finger is in the third finger deployed position;
- the third finger includes an outer portion, and the outer portion comprises a first section, a second section proximate the first section, and a sidewall between the first section and the second section, and where the second section is recessed from the first section and the sidewall is substantially perpendicular to the first section and the second section;
- a length of a sidewall corresponds to a thickness of the first finger;
- a biasing member is coupled to the third finger, and the biasing member provides a biasing force that directs the third finger towards the retracted position;
- the biasing member comprises a spring coupled to a rear portion of the third finger;
- a locking mechanism is coupled to the first finger, and the locking mechanism is movable between an engaged condition and a disengaged condition, and the leg assembly is in a static state when the locking mechanism is in the engaged condition;
- the locking mechanism includes a tab, and the tab is operably housed within a recess defined on an outer portion of the first finger when the locking mechanism is in the disengaged condition; and
- the tab includes a tab inner surface, and the tab inner surface is proximate the outer surface of the first finger when the locking mechanism is in the disengaged condition, and the tab inner surface is proximate a rear portion of the first finger when the locking mechanism is in the engaged condition.

According to a second aspect of the present disclosure, the present invention relates to a device holder assembly of a vehicle that includes a body with a body outer surface. A housing is coupled to the body. A leg assembly is coupled to the housing. The leg assembly includes a first leg and a second leg that are movable between a recessed position and an extended position. A first finger is rotatably coupled to the first leg. The first finger is movable between a first finger deployed position and a first finger retracted position. A locking mechanism is coupled to the first finger. The locking mechanism is movable between an engaged condition and a disengaged condition. The leg assembly is in a static state when the locking mechanism is in the engaged condition. A second finger is rotatably coupled to the second leg. The second finger is movable between a second finger deployed position and a second finger retracted position. A third finger is disposed between the first finger and the second finger. The third finger is rotatably coupled to a center portion of the housing. The third finger is movable between a third finger deployed position and a third finger retracted position.

Embodiments of the second aspect of the present disclosure can include any one or a combination of the following features:
- the locking mechanism includes a tab, and the tab is operably housed in a recess defined on an outer portion of the first finger when the locking mechanism is in the disengaged condition;
- a biasing member coupled to the third finger and the biasing member provides a biasing force that directs the third finger towards the retracted position;
- the biasing member comprises a spring rotatably coupled to a rear portion of the third finger;
- the first finger includes a first finger inner surface and the third finger includes a third finger inner surface, and the first finger inner surface is substantially parallel to the third finger inner surface when the first finger is in the first finger deployed position and the third finger is in the third finger deployed position;
- the third finger includes an outer portion, and the outer portion comprises a first section, a second section proximate the first section, and a sidewall between the first section and the second section, and where the second section is recessed from the first section and the sidewall is substantially perpendicular to the first section and the second section, and where the first finger inner surface contacts the second section when the first finger is in the first finger retracted position and the third finger is in the third finger retracted position; and
- a length of the sidewall corresponds to a thickness of the first finger.

According to a third aspect of the present disclosure, the present invention relates to a device holder assembly of a vehicle that includes a body with a body outer surface. A housing is coupled to the body. A leg assembly is coupled to the housing. The leg assembly includes a first leg and a second leg that are movable between a recessed position and an extended position. A first finger is rotatably coupled to the first leg. The first finger is movable between a first finger deployed position and a first finger retracted position. A locking mechanism is coupled to the first finger. The locking mechanism is movable between an engaged condition and a disengaged condition. The leg assembly is in a static state when the locking mechanism is in the engaged condition. A second finger is rotatably coupled to the second leg. The second finger is movable between a second finger deployed position and a second finger retracted position. A third finger is disposed between the first finger and the second finger. The third finger is rotatably coupled to a center portion of the housing. The third finger is movable between a third finger deployed position and a third finger retracted position. A biasing member is coupled to the third finger. The biasing member provides a biasing force that directs the third finger towards the third finger retracted position.

Embodiments of the third aspect of the present disclosure can include any one or a combination of the following features:

the body is a vehicle headrest, and wherein the housing is at least partially recessed into the body;

the third finger includes an outer portion, and the outer portion comprises a first section, a second section proximate the first section, and a sidewall between the first section and the second section, and where the second section is recessed from the first section and the sidewall is substantially perpendicular to the first section and the second section, and where a first finger inner surface contacts the second section when the first finger is in the first finger retracted position and the third finger is in the third finger retracted position; and a length of the sidewall corresponds to a thickness of the first finger.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
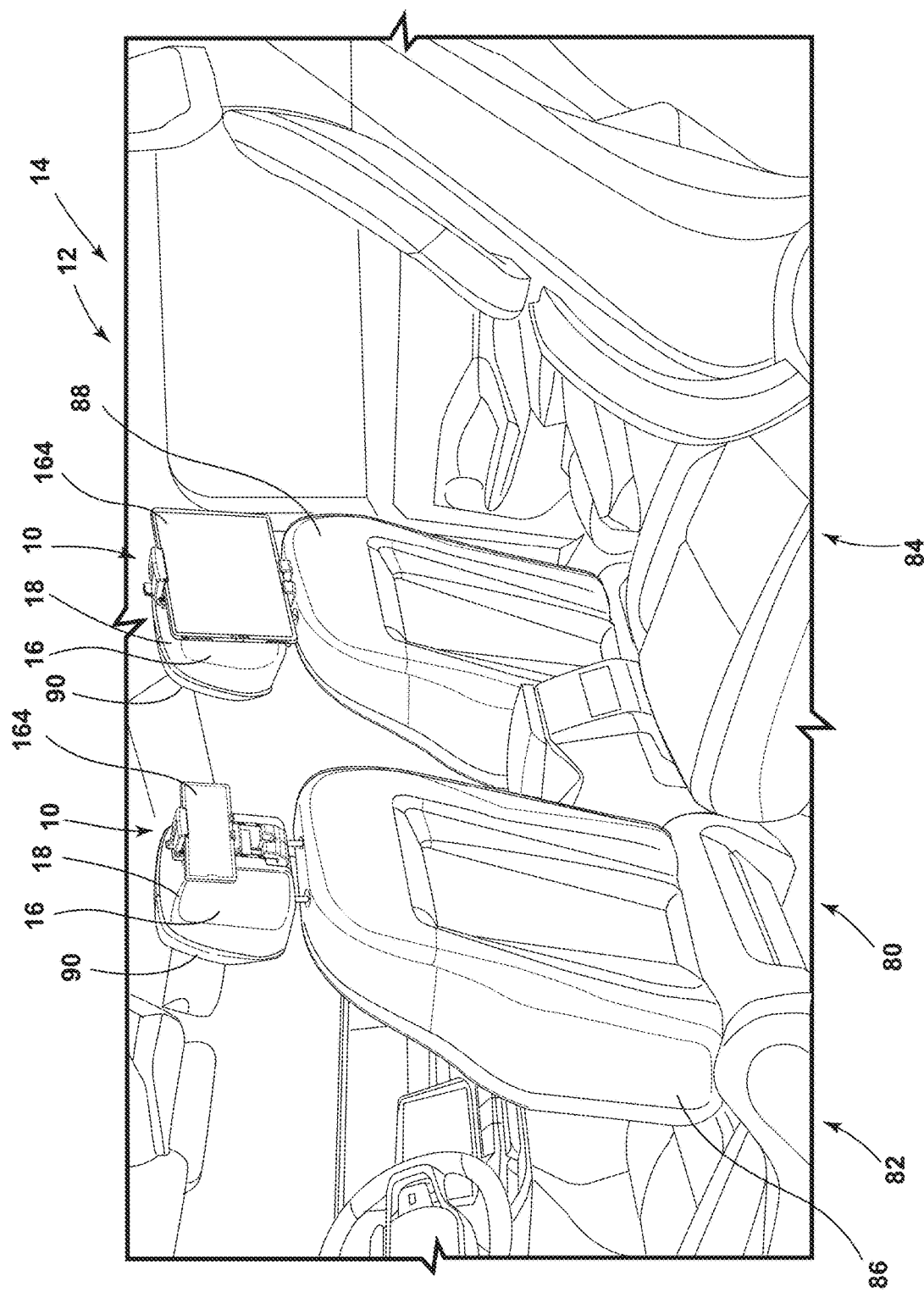
FIG. 1 is a side perspective view of a passenger compartment of a vehicle having vehicle seats equipped with device holder assemblies, according to one example.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a device holder assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-9, depicted is a vehicle interior 12 with a passenger compartment 14 that includes one or more device holder assemblies 10. The device holder assembly 10 includes a body 16 with a body outer surface 18 and a housing 20 coupled to the body 16. A leg assembly 22 is coupled to the housing 20. The leg assembly 22 includes a first leg 24 and a second leg 26. The first leg 24 and the second leg 26 are movable between a recessed position 28, 30 and an extended position 32, 34. A first finger 36 is rotatably coupled to the first leg 24. The first finger 36 is movable between a first finger deployed position 38 and a first finger retracted position 40. A locking mechanism 42 is coupled to the first finger 36. The locking mechanism 42 is movable between an engaged condition 44 and a disengaged condition 46. In the engaged condition 44, the locking mechanism 42 applies a force on the leg assembly 22 such that the leg assembly 22 is in a static state. The locking mechanism 42 includes a tab 48 operably disposed into a recess 50 defined on an outer portion 52 of the first finger 36 when the locking mechanism 42 is in the disengaged condition 46. A second finger 54 is rotatably coupled to the second leg 26. The second finger 54 is movable between a second finger deployed position 56 and a second finger retracted position 58. A third finger 60 is disposed between the first finger 36 and the second finger 54 and is rotatably coupled to a center portion 62 of the housing 20. The third finger 60 is movable between a third finger deployed position 64 and a third finger retracted position 66. A biasing member 68 is coupled to the third finger 60. The biasing member 68 provides a biasing force that directs the third finger 60 towards the retracted position 66.

Figure 2:
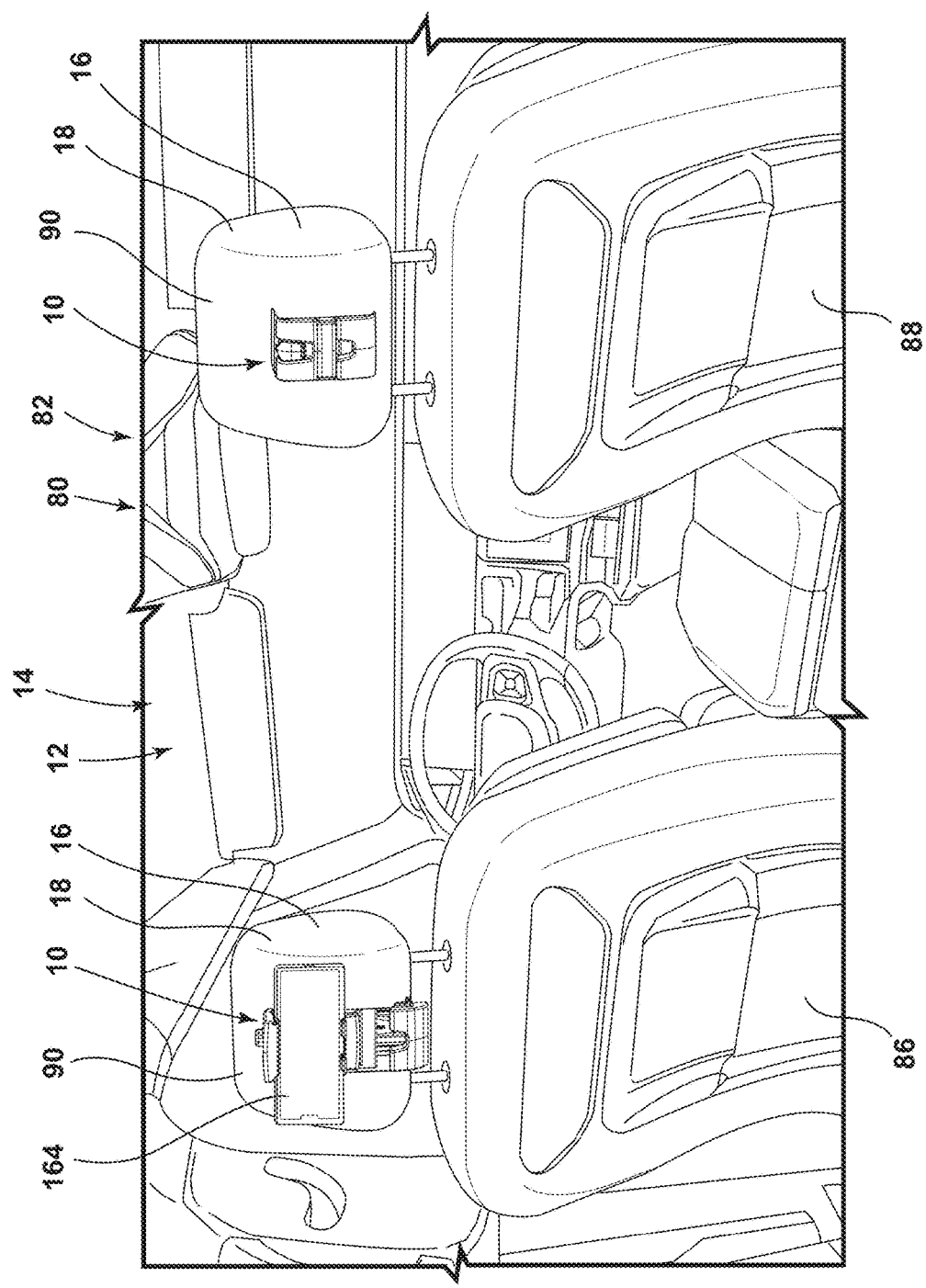
FIG. 2 is a side perspective view of a passenger compartment having vehicle seats equipped with device holder assemblies with one device holder assembly holding a larger portable device and the other device holder assembly holder a smaller portable device, according to one example.

Referring now to FIGS. 1 and 2, the vehicle interior 12 includes a passenger compartment 14 contained within a vehicle body. The passenger compartment 14 may include a first seating row 82 and a second seating row 84. Fewer or more seating rows may be included in the passenger compartment 14 without departing from the teachings herein. The first seating row 82 may be a front seating row that includes a driver seat 86 with a headrest 90 and a passenger seat 88 with the headrest 90. The second seating row 84 may include rear passenger seats 88. The rear passenger seats 88 may include bucket seating or may be bench seating. As illustrated, the second seating row 84 is bucket seating that includes a first rear passenger seat and a second rear passenger seat. The device holder assembly 10, as illustrated in FIGS. 1 and 2, may be disposed on a rear portion of a passenger seat headrest 90. In FIG. 2, one device holder assembly 10 is in a non-use condition and the other device holder assembly 10 is in a use condition.

While the passenger compartment 14, as illustrated in FIGS. 1 and 2, has the device holder assembly 10 disposed on a rear portion of the first seating row 82, it is contemplated that the device holder assembly 10 may be positioned in any practicable location within the passenger compartment 14 of the vehicle interior 12 without departing from the teachings herein.

In various examples, the passenger compartment 14 is a passenger compartment 14 that may be within the vehicle interior of a sedan, a sport utility vehicle, a truck, a van, a crossover, and/or other styles of vehicle. The passenger compartment 14 may be within the vehicle interior 12 of a manually operated vehicle (e.g., with a human driver), a fully autonomous vehicle (e.g., no human driver), or a partially autonomous vehicle (e.g., may be operated with or without a human driver).

Referring to FIGS. 1-4, the device holder assembly 10 includes the body 16 disposed in the passenger compartment 14. In some embodiments, the body 16 may include the body outer surface 18 that encompasses an outside periphery of the body 16. In other embodiments, the body 16 may include a bridge 100 extending across a portion of the housing 20. As illustrated in FIGS. 1-4, the body outer surface 18 may be at least a portion of an outside periphery of the driver's seat 86 or the passenger seat 88 and/or an outside periphery of the headrest 90. In various examples, the body 16 may be the headrest 90, the driver's seat 86, and/or the passenger seat 88 of the vehicle. In other examples, the body 16 may be a portion of the headrest 90, the driver's seat 86, and/or the passenger seat 88. In yet other examples, the body 16 may be a vehicle center console, an instrument panel, or other portion of the passenger seat 88. Additionally, or alternatively, it is generally contemplated that the body 16 may include various elements and entities within the vehicle, so long as the body 16 may operably couple and support the housing 20 and additional components of the device holder assembly 10, as provided herein.

Figure 3:
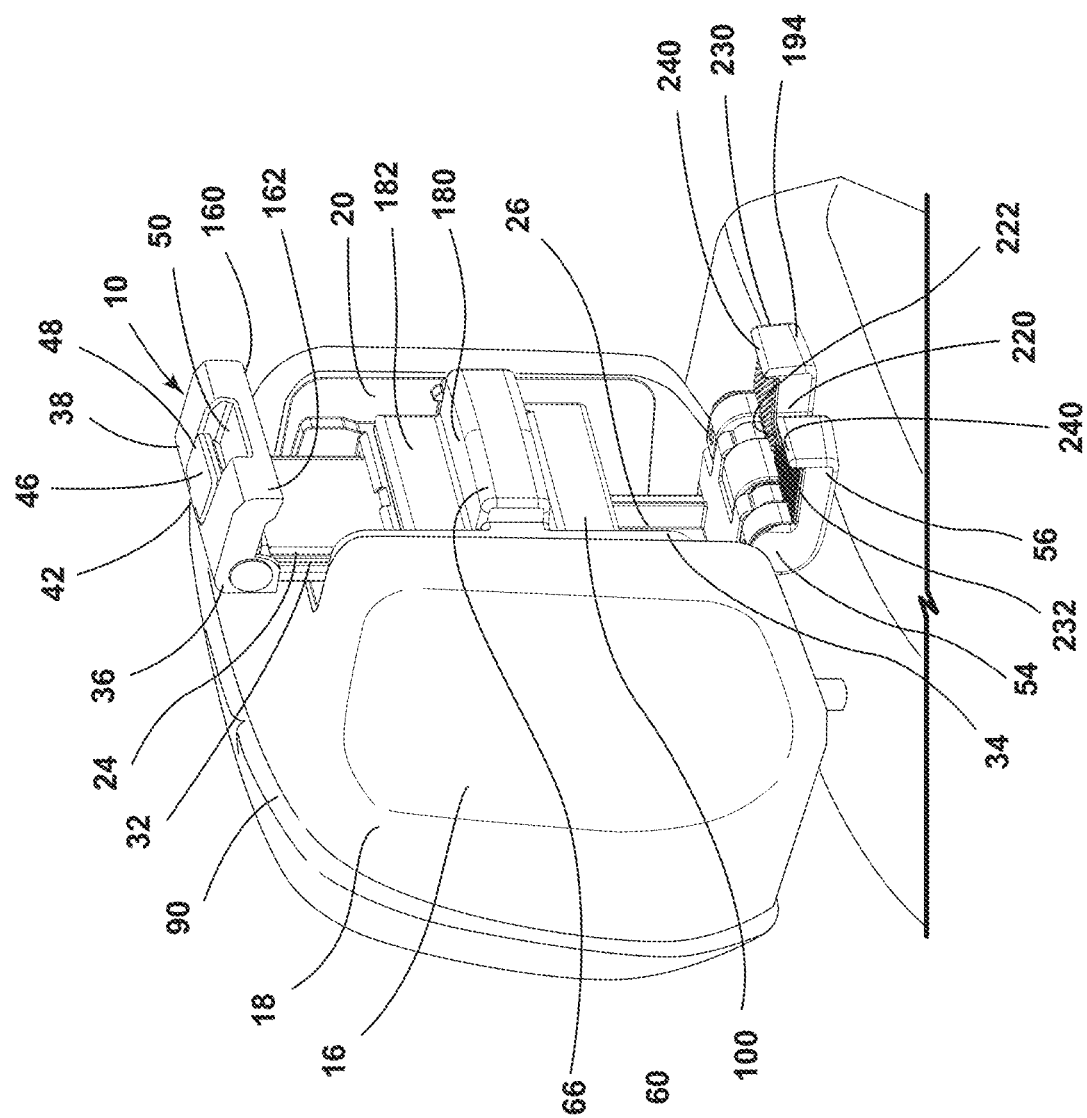
FIG. 3 is a side perspective view of a vehicle seat with a device holder assembly in a use position, according to one example.
Figure 4:
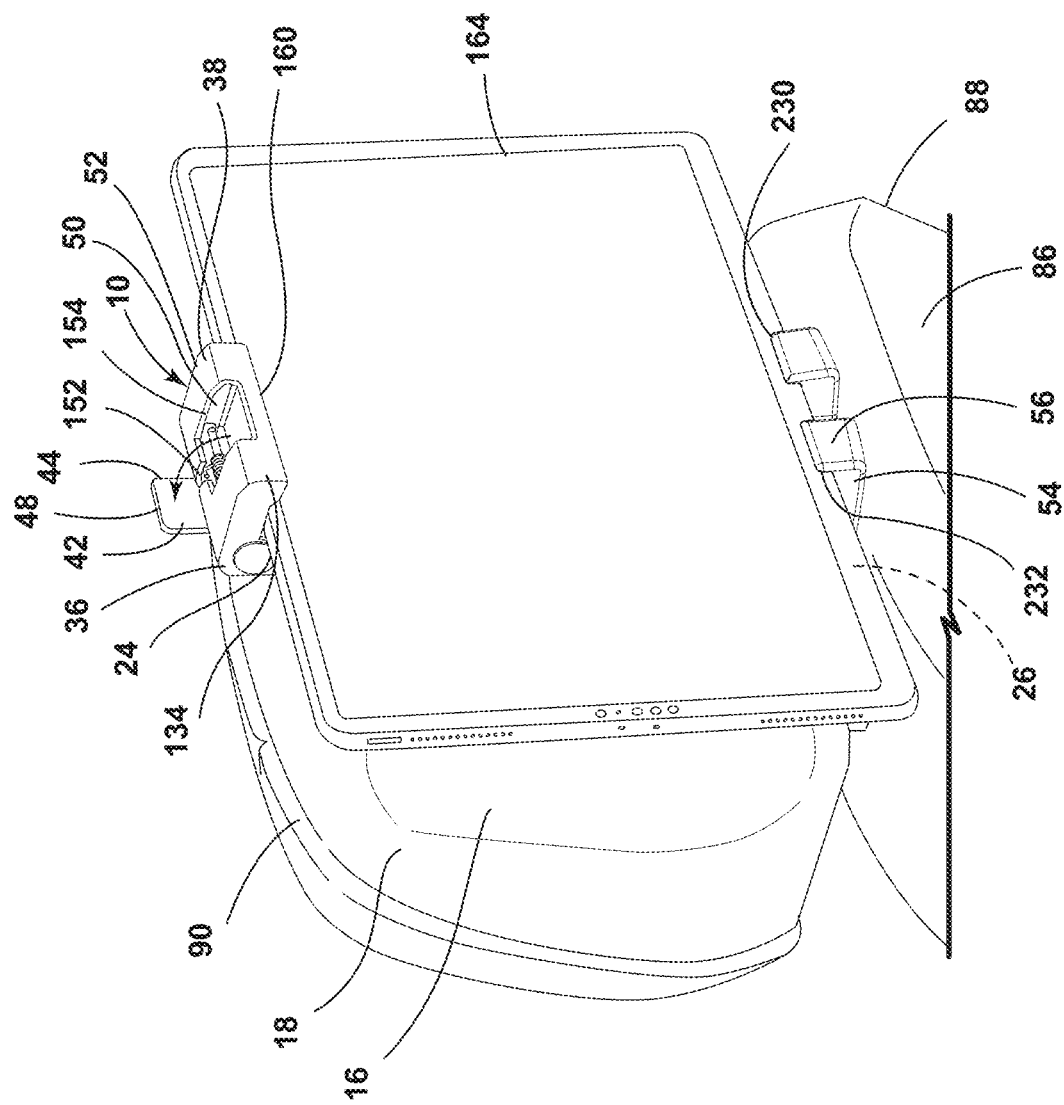
FIG. 4 is a side perspective view of a vehicle seat with a device holder assembly holding a portable device, according to one example.

Referring to FIGS. 3-9, the device holder assembly 10 includes the housing 20 coupled to the body 16. According to some examples, the housing 20 may define a substantially rectangular shape. In other examples, the housing 20 may define a substantially oval shape, or another shape, so long as the housing 20 may contain additional components of the device holder assembly 10. In various embodiments, the housing 20 may include a housing rear portion 110. The housing rear portion 110 may be distal from the body outer surface 18 such that the housing rear portion 110 is generally recessed into the body 16 and away from the body outer surface 18. As illustrated in FIGS. 3 and 4, the housing 20 may be coupled to the body 16 such that the housing rear portion 110 is recessed into the body 16 and the bridge 100 covers the center portion 62 of the housing 20. The housing 20 is generally configured to operably house additional components of the device holder assembly 10. For example, the first leg 24 and the second leg 26 may be at least partially stored within the housing 20. Additionally, or alternatively, it is contemplated that the housing 20 may have any practical shape and may be coupled to various surfaces of the body 16, so long as the housing 20 may operably contain additional components of the device holder assembly 10.

Referring to FIGS. 3-9, the device holder assembly 10 includes the leg assembly 22. The leg assembly 22 includes the first leg 24 and the second leg 26, which opposes the first leg 24. Both the first leg 24 and the second leg 26 may be slideably coupled to the housing 20. In some examples, the first finger 36 may couple to an end of the first leg 24 and the second finger 54 may couple to an end of the second leg 26, as illustrated in FIGS. 6-9. According to various aspects, both the first leg 24 and the second leg 26 are movable between the recessed position 28, 30 and the extended position 32, 34. In some examples, as both legs 24, 26 move to the extended position 32, 34, the first leg 24 may extend out of a top portion 120 of the housing 20 and the second leg 26 may extend out of a bottom portion 122 of the housing 20.

The leg assembly 22 may include a drive assembly 124 coupled to the first leg 24 and the second leg 26. The drive assembly 124 may be comprised of a gear set that is mechanically coupled to the first leg 24 and the second leg 26. According to various embodiments, the drive assembly 124 may be coupled to the first leg 24 and the second leg 26 such that a movement of the first leg 24 or the second leg 26, drives a movement of the other leg 24, 26. For example, the gear set may be a rack and pinion gear set that is coupled to the first leg 24 and the second leg 26, wherein the rack and pinion gear set provides a synchronous movement of the first leg 24 and the second leg 26. Additionally, it is generally contemplated that the drive assembly 124 may include various components in various positions, so long as the drive assembly 124 may permit movement of the first leg 24 and the second leg 26 in and out of the housing 20. Further, it is generally contemplated that the drive assembly 124 may include components that bias the first leg 24 and the second leg 26 to the recessed position 28, 30.

Referring again to FIGS. 3-9, the device holder assembly 10 includes the first finger 36 coupled to the first leg 24. The first finger 36 may be rotatably coupled to an end section 130 of the first leg 24. According to various examples, the first finger 36 may include a rear portion 132, a front portion 134 opposing the rear portion 132, the outer portion 52 between the rear portion 132 and the front portion 134, and an inner portion 138 opposing the outer portion 52. In some examples, the first finger 36 includes a first finger outer surface 140 defined on an outer periphery of the rear portion 132 and the outer portion 52, and a first finger inner surface 142 defined on the inner portion 138, wherein the first finger inner surface 142 generally opposes the first finger outer surface 140.

Figure 5:
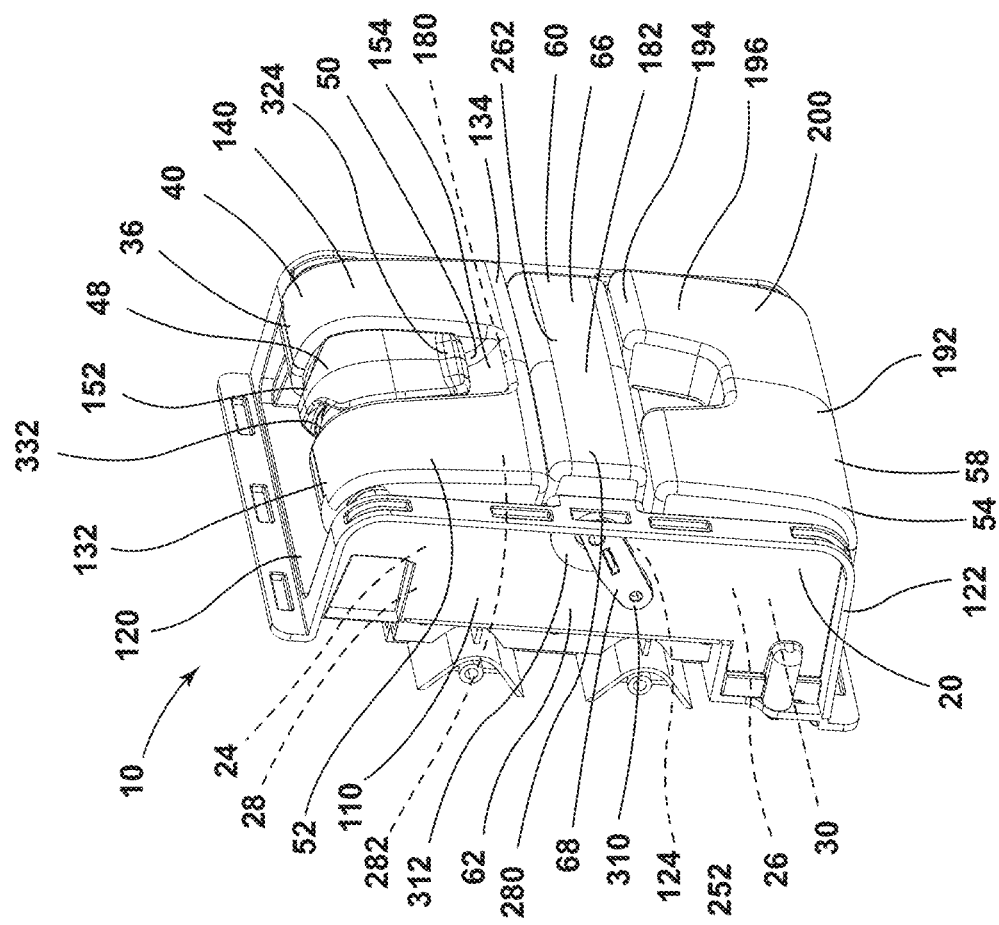
FIG. 5 is a perspective view of a device holder assembly in a non-use position, according to one example.
Figure 6:
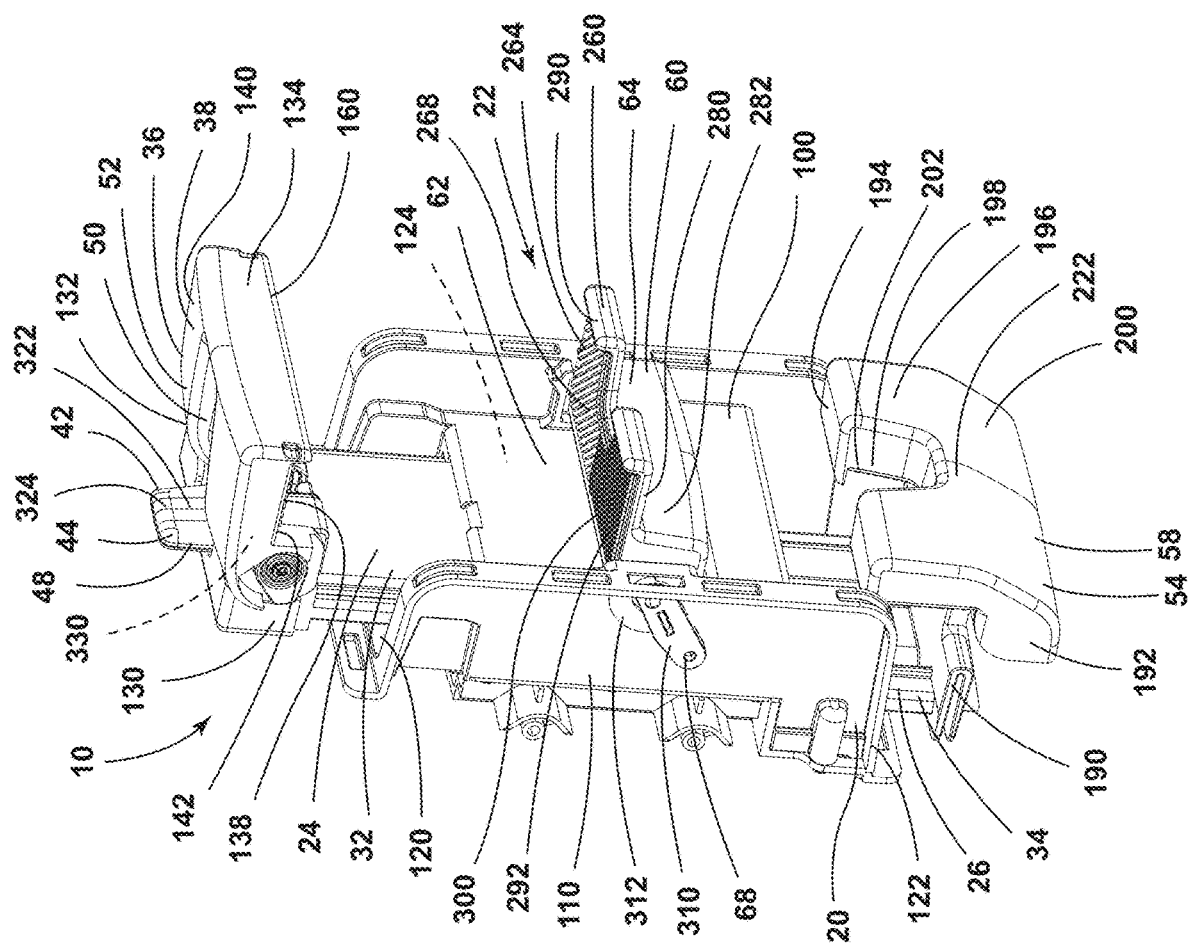
FIG. 6 is a partial perspective view of the device holder assembly of FIG. 3 in a use position, according to one example.
Figure 7:
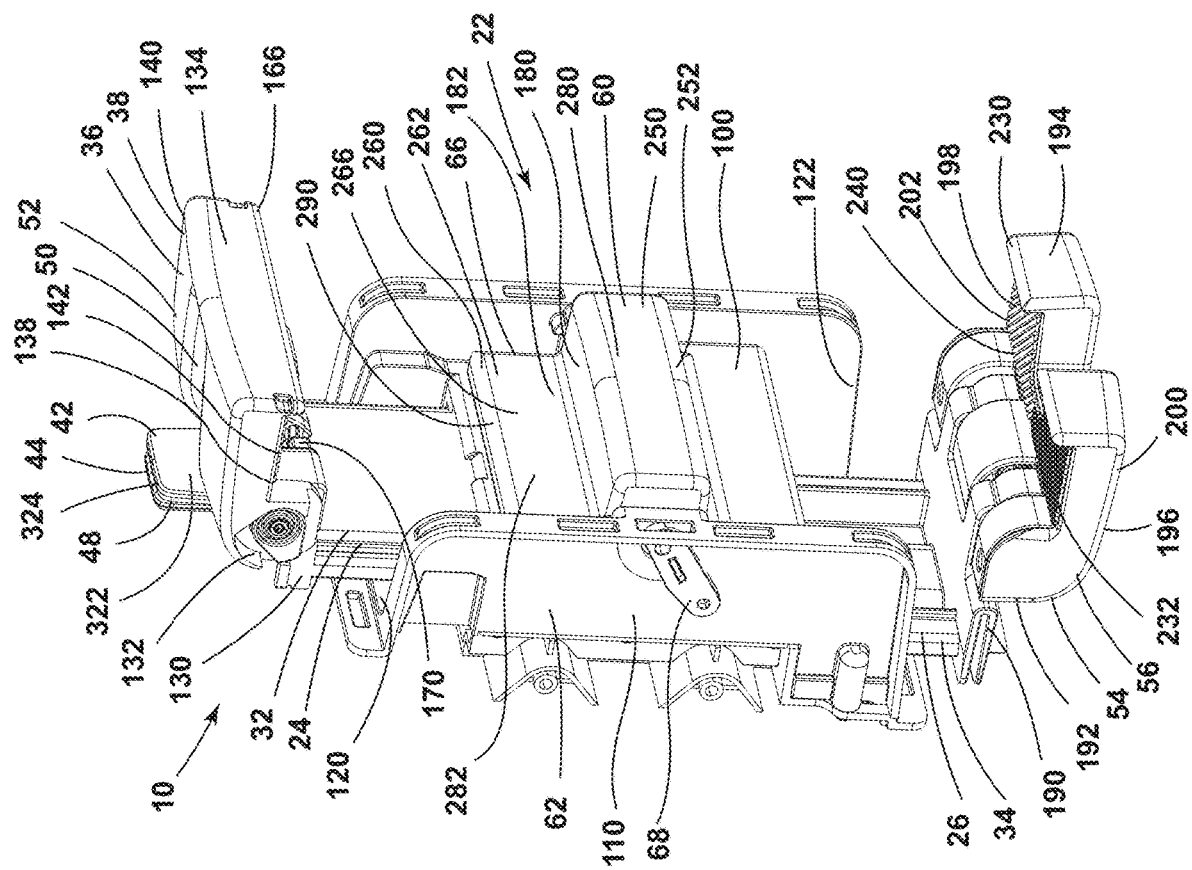
FIG. 7 is a partial perspective view of the device holder assembly of FIG. 3 in a use position, according to one example.

Referring to FIGS. 5-7, the recess 50 may be defined on the first finger 36. In some examples, the recess 50 may be defined on the outer portion 52 of the first finger 36. In yet other examples, the recess 50 may be defined on the rear portion 132 and the outer portion 52 of the first finger 36. The recess 50 may be comprised of a first region 152 defined on the rear portion 132 and a second region 154 defined on the outer portion 52. In such examples, the first region 152 may have a width less than the second region 154. The second region 154 may be defined on the outer portion 52 and extend to the front portion 134 and have a width greater than the first region 152, as illustrated in FIGS. 5-7. According to various examples, the first region 152 and the second region 154 may operably receive the tab 48 of the locking mechanism 42.

Referring again to FIGS. 3, 4, and 6-9, the first finger 36 includes a first finger lip 160. In some examples, the first finger lip 160 is coupled to the front portion 134 of the first finger 36 and extends away from the outer portion 52. In other examples, the first finger lip 160 may be integrally formed from the front portion 134 and extend perpendicular from the front portion 134. According to various aspects, the first finger lip 160 and the inner portion 138 of the first finger 36 may define a first finger cradle 162. The first finger lip 160 is configured to abut and at least partially retain a portable device 164, such as a tablet and/or cell phone.

Figure 8:
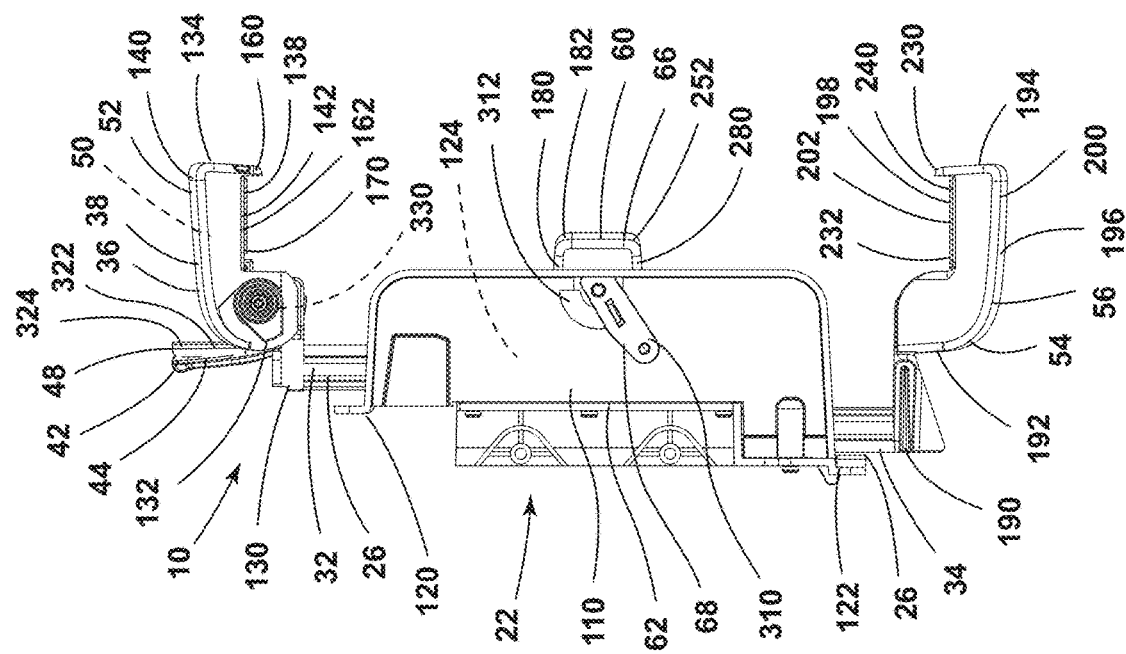
FIG. 8 is a side partial view of a device holder assembly, according to one example.

Referring to FIGS. 6-9, the inner portion 138 of the first finger 36 may include a first engagement element 170. In some examples, the first engagement element 170 may be coupled to the inner portion 138, disposed on the first finger inner surface 142, or integrally formed from the inner portion 138. In other examples, the first engagement element 170 may extend along a depth of the first finger 36. The first engagement element 170 may be comprised of various forms of engaging members, such as a textured surface, a magnet, a softer durometer rubber, or a combination thereof. For example, the first engagement element 170 may be a pair of rubber pads, as illustrated in FIG. 8. According to various aspects, the first engagement element 170 is configured to assist in retaining the portable device 164 within the first finger 36. In other examples, the first engagement element 170 is configured to allow varying placement of a side of the portable device 164 relative to a fore-aft of the first finger 36. For example, the portable device 164 may be positioned such that that a top side of the portable device 164 is abutting the first engagement element 170 and the first finger lip 160, and the portable device 164 is generally angled vehicle-downward.

The first finger 36 is operable between the retracted position 40 and the deployed position 38. In the retracted position 40, the first finger 36 is rotated vehicle-downward such that the first finger outer surface 140 is generally flush with the body outer surface 18. Additionally, in the retracted position 40, the front portion 134 of the first finger 36 may abut or be proximate to a sidewall 180 of the third finger 60, and the first finger lip 160 may abut a third finger outer surface 182. Further, in the retracted position 40, the outer portion 52 of the first finger 36 may be substantially parallel to a section of the third finger outer surface 182, as provided herein.

In the deployed position 38, the first finger 36 is rotated outward from the housing 20 such that the front portion 134 is extending outward from the housing 20 and the first finger lip 160 is extending towards the second finger 54 and the third finger 60. According to various examples, the first finger 36 is configured to receive the portable device 164 and assist in retaining the portable device 164. For example, a user may insert the portable device 164 into the first finger cradle 162 such that a side of the portable device 164 engages with the first engagement element 170 and/or the first finger lip 160 and is maintained in a static state.

Referring back to FIGS. 3-9, the device holder assembly 10 includes the second finger 54 coupled to the second leg 26. The second finger 54 may be rotatably coupled to an end section 190 of the second leg 26. According to various examples, the second finger 54 may include a rear portion 192, a front portion 194 opposing the rear portion 192, an outer portion 196 between the rear portion 192 and the front portion 194, and an inner portion 198 opposing the outer portion 196. In some examples, the second finger 54 includes a second finger outer surface 200 defined on an outer periphery of the rear portion 192 and the outer portion 196, and a second finger inner surface 202 defined on the inner portion 198, wherein the second finger inner surface 202 generally opposes the second finger outer surface 200.

Referring to FIGS. 3 and 4, an engagement recess 220 may be defined on the second finger 54. In some examples, the engagement recess 220 may be defined on a center section 222 of the second finger 54 and extend from the second finger outer surface 200 to the second finger inner surface 202. In some aspects, the engagement recess 220 may be defined as a slotted aperture extending from the rear portion 192 to the front portion 194 of the second finger 54, as illustrated in FIGS. 3 and 4. According to various examples, the engagement recess 220 is configured to provide access to one or more charging ports. In some examples, the engagement recess 220 may also provide a space in which a charging cable may extend through and be coupled to a charging port and the portable device 164.

Figure 9:
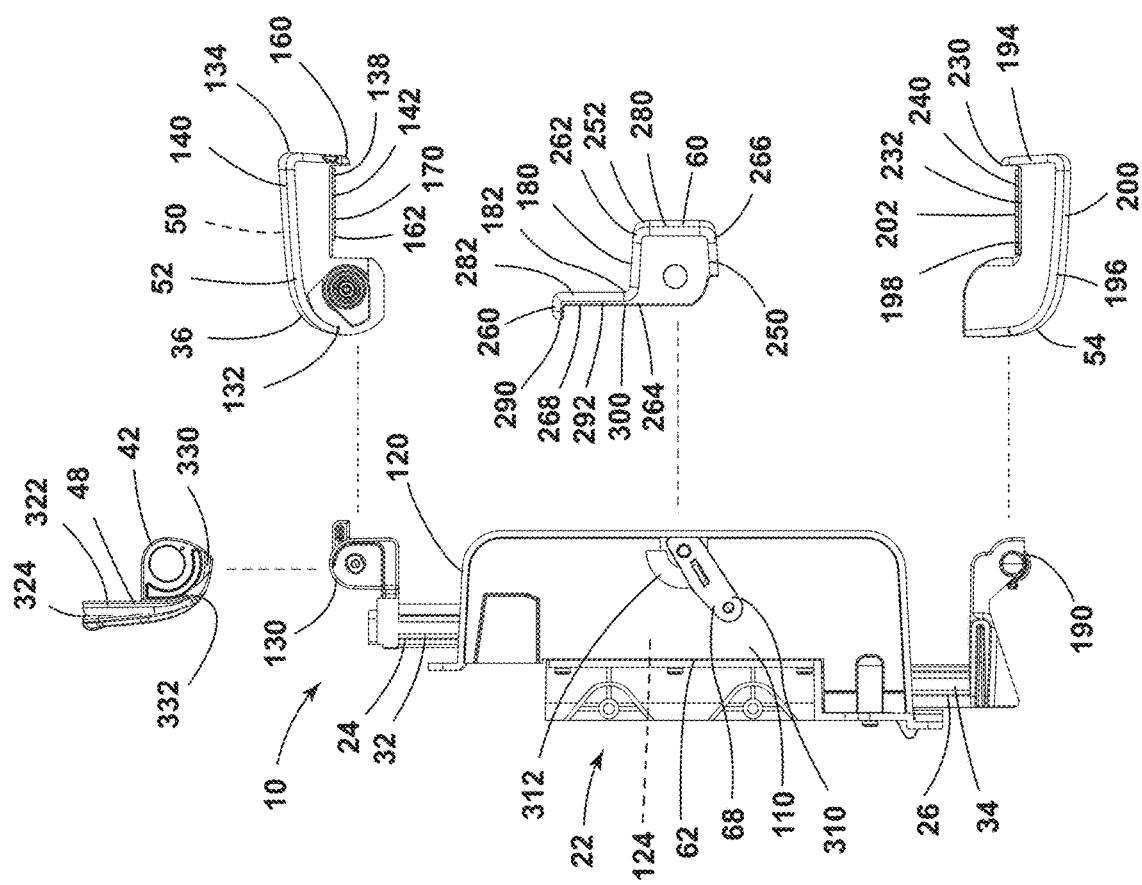
FIG. 9 is a partial, exploded view of the device holder assembly of FIG. 8, according to one example.

Referring further to FIGS. 3, 4, and 6-9, the second finger 54 includes a second finger lip 230. In some examples, the second finger lip 230 is coupled to the front portion 194 of the second finger 54 and extends away from the outer portion 196, as illustrated in FIGS. 7-9. In other examples, the second finger lip 230 may be integrally formed from the front portion 194 and extend generally perpendicular from the front portion 194 of the second finger 54. According to various aspects, the second finger lip 230 and the inner portion 198 of the second finger 54 may define a second finger cradle 232. The second finger lip 230 is configured to abut and at least partially retain the portable device 164.

Referring further still to FIGS. 6-9, the inner portion 198 of the second finger 54 may include a second engagement element 240. In some examples, the second engagement element 240 may be coupled to the inner portion 198 of the second finger 54, disposed on the second finger inner surface 202, or integrally formed from the inner portion 198 of the second finger 54. In other examples, the second engagement element 240 may extend along a depth of the second finger 54. The second engagement element 240 may be comprised of various forms of engaging members, such as a textured surface, a magnet, a softer durometer rubber, or a combination thereof. For example, the second engagement element 240 may be a pair of rubber pads, as illustrated in FIG. 3. According to various aspects, the second engagement element 240 is configured to assist in retaining a portable device 164 within the second finger 54. In other examples, the second engagement element 240 is configured to allow varying placement of a side of the portable device 164 relative to a fore-aft of the second finger 54. For example, the portable device 164 may be positioned such that a bottom side of the portable device 164 is disposed in the second finger cradle 232 and is abutting the second engagement element 240 and the second finger lip 230, and the portable device 164 is generally angled vehicle-upward.

The second finger 54 is operable between the retracted position 58 and the deployed position 56. In the retracted position 58, the second finger 54 is rotated vehicle-upward such that the second finger outer surface 200 is generally flush with the body outer surface 18. Additionally, in the retracted position 58, the front portion 194 of the second finger 54 may abut or be proximate to a rear portion 250 of the third finger 60 and a top portion 252 of the third finger 60 may be substantially parallel to a section of the third finger 60, as provided herein.

In the deployed position 56, the second finger 54 is rotated outward from the housing 20 such that the front portion 194 of the second finger 54 is extending outward from the housing 20 and the body 16, and the second finger lip 230 is extending towards the first finger 36. According to various examples, the second finger 54 is configured to receive the portable device 164 and assist in retaining the portable device 164. For example, a user may insert the portable device 164 into the second finger cradle 232 such that a side of the portable device 164 engages with the second engagement element 240 and/or the second finger lip 230 and is maintained in a static state.

Referring back to FIGS. 5-9, the device holder assembly 10 includes the third finger 60. In some examples, the third finger 60 may be pivotably coupled to the body 16. In other examples, the third finger 60 may be pivotably coupled to the housing 20. For example, the third finger 60 may be pivotably coupled to the center portion 62 of the housing 20. According to various examples, the third finger 60 may include the rear portion 250, a front portion 260 opposing the rear portion 250, an outer portion 262 between the rear portion 250 and the front portion 260, and an inner portion 264 opposing the outer portion 262. In some examples, the third finger 60 may include the third finger outer surface 182 defined on an outer periphery of the rear portion 250 and the outer portion 262, and a third finger inner surface 268 defined on the inner portion 264, wherein the third finger inner surface 268 generally opposes the third finger outer surface 182.

The third finger outer portion 262 may further comprise a first section 280, a second section 282 recessed from the first section 280, and the sidewall 180 between the first section 280 and the second section 282. As illustrated in FIGS. 5-9, the first section 280 may be defined between the rear portion 250 of the third finger 60 and the side wall 180. The second section 282 may be recessed from the first section 280 and may be defined between the sidewall 180 and the front portion 260 of the third finger 60. In some examples, the level of recession of the second section 282 relative to the first section 280 may be dictated by a length of the sidewall 180. According to various examples, the sidewall 180 length may be determined by a thickness of the first finger 36. In such examples, the sidewall 180 length and the thickness of the first finger 36 may be such that the first finger 36 operably overlays the third finger 60 and the outer portion 52 of the first finger 36 is substantially parallel with the outer portion 262 of the third finger 60 when both the first finger 36 and the third finger 60 are in the retracted position 40, 66.

Referring further to FIGS. 6 and 9, the third finger 60 includes a third finger lip 290. In some examples, the third finger lip 290 is coupled to the front portion 260 of the third finger 60 and extends away from the outer portion 262 of the third finger 60, as illustrated in FIG. 6. In other examples, the third finger lip 290 may be integrally formed from the front portion 260 of the third finger 60 and extend generally perpendicular from the front portion 260 of the third finger 60. According to various aspects, the third finger lip 290 and the inner portion 264 of the third finger 60 may define a third finger cradle 292. The third finger lip 290 is configured to abut and at least partially retain the portable device 164 and the third finger cradle 292 is configured to receive the portable device 164.

The inner portion 264 of the third finger 60 may include a third engagement element 300. In some examples, the third engagement element 300 may be coupled to the inner portion 264 of the third finger 60, disposed on the third finger inner surface 268, or integrally formed from the inner portion 264 of the third finger 60. In other examples, the third engagement element 300 may extend along a depth of the third finger 60. The third engagement element 300 may be comprised of various forms of engaging members, such as a textured surface, a magnet, a softer durometer rubber, or a combination thereof. For example, the third engagement element 300 may be comprised of a plurality of ribs or a textured surface defined along a depth of the third finger inner surface 268. According to various aspects, the third engagement element 300 is configured to assist in retaining a portable device 164 within the third finger 60. In other examples, the third engagement element 300 is configured to allow varying placement of a side of the portable device 164 relative to a fore-aft of the third finger 60. For example, the portable device 164 may be positioned such that a bottom side of the portable device 164 is abutting the third engagement element 300 and the third finger lip 290, and the portable device 164 is generally angled vehicle-upward.

The third finger 60 is operable between the retracted position 66 and the deployed position 64. In the retracted position 66, the third finger 60 is rotated vehicle-upward and the first section 280 of the outer portion 262 may be generally parallel with the body outer surface 18. In some examples, the second section 282 may be recessed relative to the body outer surface 18 and overlayed by the first finger 36 when the first finger 36 is in the retracted condition 40. In such examples, the outer portion 52 of the first finger 36 may be substantially parallel to the second section 282 and the second section 282 may be visibly hidden. Furthermore, in the retracted position 66, the rear portion 250 of the third finger 60 may abut or is proximate to a bridge 100 of the body 16 and the third finger lip 290 may be proximate the rear portion 132 of the first finger 36 and/or the first leg 24.

In the deployed position 64, the third finger 60 is rotated outward from the housing 20 such that the front portion 260 of the third finger 60 is extending outward from the base 20 and the third finger lip 290 is extending towards the first finger 36. According to various examples, the third finger 60 is configured to receive the portable device 164 and assist in retaining the portable device 164. For example, a user may insert the portable device 164 into the third finger cradle 292 such that a side of the portable device 164 engages with the third engagement element 300 and/or the third finger lip 290 and is maintained in a static state. Additionally, it is generally contemplated that the third finger 60 may be coupled to the housing 20 or body 16 such that the third finger 60 is in a mirrored configuration. For example, the third finger 60 may be rotated vehicle-downward to the retracted position 66 and the third finger lip 290 and the second finger lip 230 may each extend towards one another 230, 290 when both the second finger 54 and the third finger 60 are in the deployed position 56, 64.

Referring again to FIGS. 5-9, the biasing member 68 may be coupled to the third finger 60. In some examples, the biasing member 68 may be coupled to the housing 20 and the third finger 60. For example, the biasing member 68 may include a first member 310 and a second member 312 movably coupled to the first member 310. The first member 310 may then be coupled to the housing 20 and the second member 312 may be coupled to the third finger 60, such as the rear portion 250 of the third finger 60. In other examples, the biasing member 68 may include one or more of various forms of biasing elements. For example, the first member 310 and/r the second member 312 may be at least one torsion spring coupled to the third finger 60 and the housing 20. According to various aspects, the biasing member 68 is configured to provide a biasing force that directs the third finger 60 towards the retracted position 66. For example, the biasing force may direct the third finger 60 towards the retracted position 66 such that the third finger 60 remains in the retracted position 66 when not in use. In other examples, the biasing force provided by the biasing member 68 may serve as a retaining force for a portable device 164. For example, the biasing force may bias the third finger 60 such that an upward force is applied on a bottom portion of the portable device 164. The upward force from the biasing member 68 and contact between the portable device 164 and the first finger 36 is such that a compressing force is applied on the portable device 164 and the portable device 164 is kept in a generally static state. Additionally, or alternatively, it is generally contemplated that the biasing member 68 may include various kinds of biasing elements, so long as the biasing member 68 may apply a directed force to the third finger 60. Furthermore, it is generally contemplated that the device holder assembly 10 may include one or more biasing members 68 coupled to various components of the device holder assembly 10. For example, the device holder assembly 10 may include at least one biasing member 68 coupled to the first finger 36 and at least one biasing member 68 coupled to the third finger 60, wherein each biasing member 68 provides a biasing force that directs each finger 36, 54, 60 to the retracted position 40, 58, 66.

Referring to FIGS. 3-9, the device holder assembly 10 includes the locking mechanism 42. In some examples, the locking mechanism 42 may be constructed as a locking lever and may be coupled to the first finger 36 or the second finger 54. For example, the locking mechanism 42 may be pivotably coupled to the first finger 36. In other examples, the locking mechanism 42 may be pivotable between the engaged condition 44 and the disengaged condition 46. In the engaged condition 33, the leg assembly 22 may be in a static state due to a force applied by the locking mechanism 42. In some examples, the locking mechanism 42 is configured to apply a compressive force on the leg assembly 22 when the locking mechanism 42 is in the engaged condition 44. The compressive force, in turn, may put the leg assembly 22 is in a static state, as provided herein.

Referring further to FIGS. 3-9, the locking mechanism 42 may include the tab 48. As illustrated in FIGS. 3 and 4, the tab 48 may generally define a straight shape, or the tab 48 may generally define a shape that coincides with a shape of the first finger 36, the rear portion 132 of the first finger 36, and/or the outer surface 140 of the first finger 36. For example, the tab 48 may define a curvature that coincides with a curvature defined on the rear portion 132 and/or outer surface 140 of the first finger 36. In such examples, the tab 48 may include a tab inner surface 322 that is proximate the outer surface 140 of the first finger 36 when the locking mechanism 42 is in the disengaged condition 46 and is proximate the rear portion 132 of the first finger 36 when the locking mechanism 42 is in the engaged condition 44. Additionally, or alternatively, it is generally contemplated that the tab 48 may be coupled to various components of the device holder assembly 10 and may generally defined various shapes, so long as the tab 48 provides a user means to operate the locking mechanism 42, as provided herein As illustrated in FIGS. 3 and 4, the locking mechanism 42 may be operably disposed in the recess 50 as the locking mechanism 42 pivots between the engaged condition 44 and the disengaged condition 46. In some examples, the tab 48 may be disposed in the second region 154 of the recess 50 when the locking mechanism 42 is in the disengaged condition 46 such that the tab 48 is generally flush with the outer surface 140 of the first finger 36. In other examples, the recess 50 may extend beyond a first end 324 of the tab 48 and provide a space between the tab 48 and the recess 50. The space may then allow a user to grasp the tab 48 and lift the tab 48 such that the locking mechanism 42 pivots from the disengaged condition 46 to the engaged condition 44. In the engaged condition 44, the tab 48 may then be spaced apart from the recess 50. In some examples, the tab 48 may be oriented perpendicular to the outer portion 52 of the first finger 36 or the outer portion 196 of the second finger 54 when the locking mechanism 42 is in the engaged condition 44.

Referring to FIG. 9, the locking mechanism 42 includes a retaining member 330 configured as a cam interface. The cam interface 330 can be coupled to the tab 48 and/or can be integrally formed at a second end 332 of the tab 48. In other examples, the cam interface 330 may be coupled to the first finger 36 and the first leg 24 or the second finger 54 and the second leg 26. In some examples, the cam interface 330 may define a non-circular or asymmetrical shape. According to various aspects, the cam interface 330 is configured to apply a compressive force on the leg assembly 22 as the locking mechanism 42 pivots from the disengaged condition 46 to the engaged condition 44.

It is generally contemplated that the cam interface 330 may apply the compressive force in a variety of ways. In some examples, the cam interface 330 may engage with a mechanical feature that then engages with the drive assembly 124. In such examples, the cam interface 330, due to its non-circular shape, may provide a compressive force upon the mechanical feature as the locking mechanism 42 pivots to the engaged position 44. The mechanical feature may then transfer the force to the drive assembly 124 via a mechanical coupling between the drive assembly 124 and the mechanical feature. In instances where the drive assembly 124 is constructed as a gear set, such as a rack and pinion gear set, the mechanical feature may include gear teeth that engage with the gear set. The gear teeth may then transfer the compressive force from the cam interface 330 onto the gear set and generate a rotational force that pulls the leg assembly 22 to the recessed position 28, 30. It is also generally contemplated that the cam interface 330 may apply a compressive force through a variety of different components and/or mechanisms, such as a tensioned spring or material, so long as the cam interface 330 can apply a compressive force on the leg assembly 22. It is further generally contemplated that the locking mechanism 42 may include other various components, such as a member engaging with the drive assembly 124 or a member coupled to the housing 20, or other various components.

In operation of an exemplary embodiment of the device holder assembly 10, the device holder assembly 10 may initially be in a non-use position. In the non-use position, the leg assembly 22 is in the recessed position 28, 30 and the first leg 24 and second leg 26 are stored within the housing 20. Further, in the non-use position, the first finger 36, the second finger 54, and the third finger 60 are in the retracted position 40, 58, 66. Furthermore, the first finger 36 overlays the third finger 60 and the outer portion 52 of the first finger 36 is substantially parallel with the outer portion 262 of the third finger 60. Further still, the locking mechanism 42 is in the disengaged condition 46 and the tab 48 is generally flush with the outer portion 52 of the first finger 36 or the outer portion 196 of the second finger 54. The non-use position of the device holder assembly 10 can be illustrated in FIG. 2.

A user desiring to use the device holder assembly 10 may grab the first finger 36 and rotate the first finger 36 from the retracted position 40 to the deployed position 38. As the first finger 36 rotates to the deployed position 38, the biasing member 68 coupled to the first finger 36 tensions and provides an opposing rotational force on the first finger 36. After the first finger 36 is in the deployed position 38, the user may linearly translate the leg assembly 22 from the recessed position 28, 30 to the extended position 32, 34. In some examples, the user may translate both legs 24, 26 instantaneously via the drive assembly 124 by grasping and pulling either the first leg 24 or the second leg 26.

Once the leg assembly 22 is in the extended position 32, 34 and the first finger 36 is in the deployed position 38, the user may insert a top portion of the portable device 164 into the first finger cradle 162 such that the top portion is against the first engagement element 170 disposed on the first finger inner surface 142 and abuts the first finger lip 160. Next, the user may either grab the second finger 54 or the third finger 60, and rotate either finger 54, 60 to the deployed position 56, 64.

If the portable device 164 is a larger device, such as a tablet, as illustrated in FIG. 2, the user may grab the second finger 54 and rotate the second finger 54 from the retracted position 58 to the deployed position 56. As the second finger 54 pivots to the deployed position 56, the biasing member 68 may tension and provide an opposing, biasing force. The user may then insert a bottom portion of the portable device 164 into the second finger cradle 232 such that the bottom portion is against the second engagement element 240 disposed on the second finger inner surface 202 and abuts the second finger lip 230.

If the portable device 164 is a smaller device, such as a phone in landscape orientation, as illustrated in FIG. 2, the user may grab the third finger 60 and rotate the third finger 60 from the retracted position 66 to the deployed position 64. As the third finger 60 pivots to the deployed position 64, the biasing member 68 tensions and provides an opposing, biasing force. The user may then insert the bottom portion of the personal device 164 such that the bottom portion is inserted into third finger cradle 292 and is against the third engagement element 300 and abutting the third finger lip 290. Additionally, if desiring to adjust the viewing angle of the personal device 164, the user may then tilt the personal device 164 to varying degrees by adjusting the position of the portable device 164 within the third finger cradle 292.

Once the portable device 164 is operably disposed in the device holder assembly 10, the user may apply a securing force that assists in retaining the portable device 164 by rotating the locking mechanism 42 from the disengaged condition 46 to the engaged condition 44. By way of example, the user may first grab the locking mechanism 42 by reaching into the space between the recess 50 and the tab 48, and then by grasping the first end 324 of the tab 48. Next, the user may apply a rotational force that causes the tab 48 and the locking mechanism 42 to rotate. As the locking mechanism 42 rotates upward, the tab 48 pivots out of the recess 50 such that the tab 48 is no longer flush with the outer portion 52 of the first finger 36. Further, as the locking mechanism 42 rotates upward, the retaining member 330, which is illustrated as a cam interface, likewise rotates. The non-circular construction of the cam interface 330 then provides a compressing force as an elongated portion of the cam engages with the leg assembly 22. Once the locking mechanism 42 is in the engaged position 44, the tab 48 is generally perpendicular to the outer portion 52 of the first finger 36.

A user, desiring to remove the portable device 164 and return the device holder assembly 10 to the non-use position, may first grab the second finger 54 or the third finger 60, depending on the finger 54, 60 used, and remove the bottom portion of the portable device 164 away from either finger 54, 60. The user may then release the second finger 54 or the third finger 60, which will then pivot to the retracted position 58, 66 due to the biasing member 68. Next, the user may grab the first finger 36 and remove the top portion of the personal device 164 out of the first finger cradle 162 and the inner portion 138 of the first finger 36. The user may then pivot the first finger 36 back to the retracted position 40 and push the first leg 24 back to the recessed position 28. As the first leg 24 translates to the recessed position 28, the second leg 26 will likewise translate to the recessed position 30 due to the drive assembly 124. Once the leg assembly 22 is back to the recessed position 28, 30 the device holder assembly 10 is back to the non-use position.

Use of the presently disclosed device may provide for a variety of advantages. For example, the housing 20 may be coupled to various bodies 16, such as a driver's seat 86, passenger seat 88, various other seats, a side panel, or an instrument panel of a vehicle. The various bodies 16 capable of coupling to the housing 20 permit increased options of placement of the device holder assembly 10 and, in turn, increased variance in placement and viewership of one or more portable devices 164. Additionally, the incorporation of the third finger 60 advantageously provides for increased placement and variance of portable devices 164 that may be retained within the device holder assembly 10. For example, the third finger 60 and first finger 36 may retain a portable device 164, such as a cell phone, that may be of a size that is less than a minimum size required to fit and be retained by the first finger 36 and the second finger 54. Further, the placement of the third finger 60 proximate the first finger 36 and at least partially recessed under the first finger 36 provides for the inclusion of the third finger 60 without increasing the footprint of the device holder assembly 10.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably connected" or "operably coupled" to each other to achieve the desired functionality. Some examples of operably couplable include, but are not limited to, physically mateable and/or physically interacting components and/or wirelessly interactable and/or wirelessly interactable components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, wherein is defined by the following claims, as interpreted according to the principles of patent law, including the doctrine of equivalents.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A device holder assembly of a vehicle comprising:
a body having a body outer surface;
a housing coupled to the body;
a leg assembly coupled to the housing, the leg assembly comprising:
 a first leg; and
 a second leg, wherein the first leg and the second leg are movable between a recessed position and an extended position;
a first finger rotatably coupled to the first leg, the first finger being movable between a first finger deployed position and a first finger retracted position;
a second finger rotatably coupled to the second leg, the second finger being movable between a second finger deployed position and a second finger retracted position;
a third finger disposed between the first finger and the second finger and rotatably coupled to a center portion of the housing, the third finger being movable between a third finger deployed position and a third finger retracted position; and
a locking mechanism coupled to the first finger, the locking mechanism movable between an engaged condition and a disengaged condition, wherein the leg assembly is in a static state when the locking mechanism is in the engaged condition, wherein the locking mechanism includes a tab, and wherein the tab is operably housed within a recess defined on an outer portion of the first finger when the locking mechanism is in the disengaged condition.

2. The device holder assembly of claim 1, wherein the first finger includes a first finger inner surface and the third finger includes a third finger inner surface, and wherein the first finger inner surface is substantially parallel to the third finger inner surface when the first finger is in the first finger deployed position and the third finger is in the third finger deployed position.

3. The device holder assembly of claim 2, wherein the third finger includes an outer portion, the outer portion comprising a first section, a second section proximate the first section, and a sidewall between the first section and the second section, and wherein the second section is recessed from the first section and the sidewall is substantially perpendicular to the first section and the second section.

4. The device holder assembly of claim 3, wherein a length of the sidewall corresponds to a thickness of the first finger.

5. The device holder assembly of claim 1, further comprising a biasing member coupled to the third finger, the biasing member providing a biasing force that directs the third finger towards the third finger retracted position.

6. The device holder assembly of claim 5, wherein the biasing member comprises a spring coupled to a rear portion of the third finger.

7. The device holder assembly of claim 1, wherein the tab includes a tab inner surface, the tab inner surface being proximate the outer surface of the first finger when the locking mechanism is in the disengaged condition, and wherein the tab inner surface is proximate a rear portion of the first finger when the locking mechanism is in the engaged condition.

8. A device holder assembly of a vehicle comprising:
a body having a body outer surface;
a housing coupled to the body;
a leg assembly coupled to the housing, the leg assembly comprising:
a first leg; and
a second leg, wherein the first leg and the second leg are movable between a recessed position and an extended position;
a first finger rotatably coupled to the first leg, the first finger being movable between a first finger deployed position and a first finger retracted position;
a locking mechanism coupled to the first finger, the locking mechanism movable between an engaged condition and a disengaged condition, wherein the leg assembly is in a static state when the locking mechanism is in the engaged condition, wherein the locking mechanism includes a tab, and wherein the tab is operably housed in a recess defined on an outer portion of the first finger when the locking mechanism is in the disengaged condition;
a second finger rotatably coupled to the second leg, the second finger being movable between a second finger deployed position and a second finger retracted position; and
a third finger disposed between the first finger and the second finger and rotatably coupled to a center portion of the housing, the third finger being movable between a third finger deployed position and a third finger retracted position.

9. A device holder assembly of a vehicle comprising:
a body having a body outer surface;
a housing coupled to the body;
a leg assembly coupled to the housing, the leg assembly comprising:
a first leg; and
a second leg, wherein the first leg and the second leg are movable between a recessed position and an extended position;
a first finger rotatably coupled to the first leg, the first finger being movable between a first finger deployed position and a first finger retracted position;
a locking mechanism coupled to the first finger, the locking mechanism movable between an engaged condition and a disengaged condition, wherein the leg assembly is in a static state when the locking mechanism is in the engaged condition;
a second finger rotatably coupled to the second leg, the second finger being movable between a second finger deployed position and a second finger retracted position;
a third finger disposed between the first finger and the second finger and rotatably coupled to a center portion of the housing, the third finger being movable between a third finger deployed position and a third finger retracted position; and
a biasing member coupled to the third finger, the biasing member providing a biasing force that directs the third finger towards the third finger retracted position.

10. The device holder assembly of claim 9, wherein the biasing member comprises a spring rotatably coupled to a rear portion of the third finger.

11. The device holder assembly of claim 9, wherein the first finger includes a first finger inner surface and the third finger includes a third finger inner surface, and wherein the first finger inner surface is substantially parallel to the third finger inner surface when the first finger is in the first finger deployed position and the third finger is in the third finger deployed position.

12. The device holder assembly of claim 11, wherein the third finger includes an outer portion, the outer portion comprising a first section, a second section proximate the first section, and a sidewall between the first section and the second section, and wherein the second section is recessed from the first section and the sidewall is substantially perpendicular to the first section and the second section, and wherein the first finger inner surface contacts the second section when the first finger is in the first finger retracted position and the third finger is in the third finger retracted position.

13. The device holder assembly of claim 12, wherein a length of the sidewall corresponds to a thickness of the first finger.

* * * * *